United States Patent [19]
Caushik

[11] Patent Number: 6,041,075
[45] Date of Patent: Mar. 21, 2000

[54] SCHEME FOR THE DETECTION OF V.25 TER RESPONSES FROM MODEM, ON A TAP1 VOICE CALL

[75] Inventor: Ramesh Caushik, Portland, Oreg.

[73] Assignee: Intel Corporation, Santa Clara, Calif.

[21] Appl. No.: 08/939,610

[22] Filed: Sep. 29, 1997

[51] Int. Cl.⁷ .................................................... H04B 1/38
[52] U.S. Cl. ............................................ 375/222; 375/377
[58] Field of Search ..................................... 375/222, 377; 370/359, 419, 463, 465, 271; 379/93.11, 93.09, 93.28; 395/883

[56] References Cited

U.S. PATENT DOCUMENTS

| | | | |
|---|---|---|---|
| 5,675,831 | 10/1997 | Caputo | 710/10 |
| 5,815,682 | 9/1998 | Williams et al. | 395/500.46 |

*Primary Examiner*—Tesfaldet Bocure
*Attorney, Agent, or Firm*—Blakely, Sokoloff, Taylor & Zafman LLP

[57] ABSTRACT

A Telephony dialer communicates with a telephony application programming interface to conduct transaction over through a communication port in any of a plurality of modes supported by the application programming interface. A snoop module snoops the port to detect an incoming character string requesting a transition into an ancillary mode not supported by the application programming interface. A modem call control module facilitates a transition into the ancillary mode.

15 Claims, 6 Drawing Sheets

SCHEME FOR THE DETECTION OF V.25 TER RESPONSES FROM MODEM, ON A TAPI VOICE CALL

BACKGROUND OF THE INVENTION

1. Field of the Invention

The invention relates to communication systems. More specifically, the invention relates to detecting responses from a modem system not supported by a usual data path.

2. Related Art

Communication systems permitting communications over phone lines via modems are generally well known in the art. More recently, other kinds of communication links, such as ISDN, have become common. So that application programmers need not be concerned with the physical communication layer, Application Programmer Interfaces (APIs) have been developed. Particularly, Microsoft has developed a telephony API (TAPI), which is widely used throughout the industry. Current versions of TAPI provide support for voice, data, and fax communication modes. Unfortunately, newer modes of communication, including for example, videophone mode are not supported by TAPI. It is expected that new modes will continue to be developed and accordingly, the case of ancillary modes will be of continued importance.

FIG. 1 is a block diagram showing layers and data flow in one example of a prior art system. A telephony dialer 1 sends commands to and receives responses from a TAPI module 2. A TAPI module 2 provides the commands to the telephony service provider (TSP) such as Unimodem.tsp 3. Unimodem.tsp 3 is provided by Microsoft Corporation. Unimodem.tsp 3 in conjunction with Unimodem.vxd 4 are the layers that actually talks to the communication device, whether it be a modem or, for example, an ISDN card. Unimodem.tsp 3 is specific to supporting communications over the telephone lines using a modem. Unimodem.vxd 4 translates higher level modem commands into the command strings for the modem being used. Virtual Communications driver 5 (VCOMM driver) reads and writes to the port in response to commands from Unimodem.vxd 4. The modem port driver 6 drives communications to and from modem 7 which supports videophone mode.

There are also existing videophone applications. Videophone application 8 communicates with a modem call control (MCC) module 9, a H324 protocol stack 10 and a V. 80 modem driver 11. To originate a videophone call on the local side of the connection. If the user decides to use the video phone mode, videophone application 8 sends commands to MCC module 9, which in turn disables telephony dialer 1 and TAPI module 2 as the videophone call will necessarily be handled along data path 23.

A problem exists because assuming that both the remote and local communication ends have the form shown in FIG. 1, while either side could originate a videophone call, neither side could recognize and therefore respond to an incoming videophone call. During a voice call established through TAPI, voice commands and events in a voice call follow data path 21 through each of layers 1–7. Data path 23 is disabled during a voice call. Thus, if a remote request to switch from video phone mode is received by modem 7, the modem 7 will recognize the request, but will wait for instructions from the host before switching into videophone mode. Thus, the request is forwarded up data path 22. When the request reaches Unimodem.TSP 3, Unimodem.TSP 3 will discard the request as an unknown string. Thus, it is not possible to establish a videophone link responsive to a remote request.

In view of the foregoing, it would be desirable to have a way to detect requests to transition into a mode not supported by TAPI. Videophone mode is merely one exemplary mode not supported by TAPI for which it would be desirable to detect requests.

BRIEF SUMMARY OF THE INVENTION

A method and apparatus for identifying requests to enter an ancillary mode in a communication system is disclosed. A telephony dialer communicates with a telephony application programming interface to conduct transactions through a communication port in any of a plurality of modes supported by the application programming interface. A snoop module snoops the port to detect an incoming character string requesting a transition into an ancillary mode not supported by the application programming interface. A modem call control module facilitates a transition into the ancillary mode once the request to transition is received and identified by the snoop module.

DETAILED DESCRIPTION OF THE INVENTION

As noted above, existing systems frequently do not support all communication modes. Thus, while ancillary support for a particular communication mode may be available, requests to enter the mode not supported by the usual communication path are discarded. Thus, no transition into the ancillary mode occurs. As used herein, ancillary mode refers to a mode not supported by layers of a primary data flow path. To allow for transition into the ancillary mode, it is necessary that a request be detected when received. By providing a snoop module that watches the port for a request string, if the request string is received the snoop module provides appropriate signaling to cause the transition into the ancillary mode to occur. In this way, the mode not supported by the primary data transfer system can be supported in a modular fashion without requiring changes to the original data transfer layers.

Figure 1:
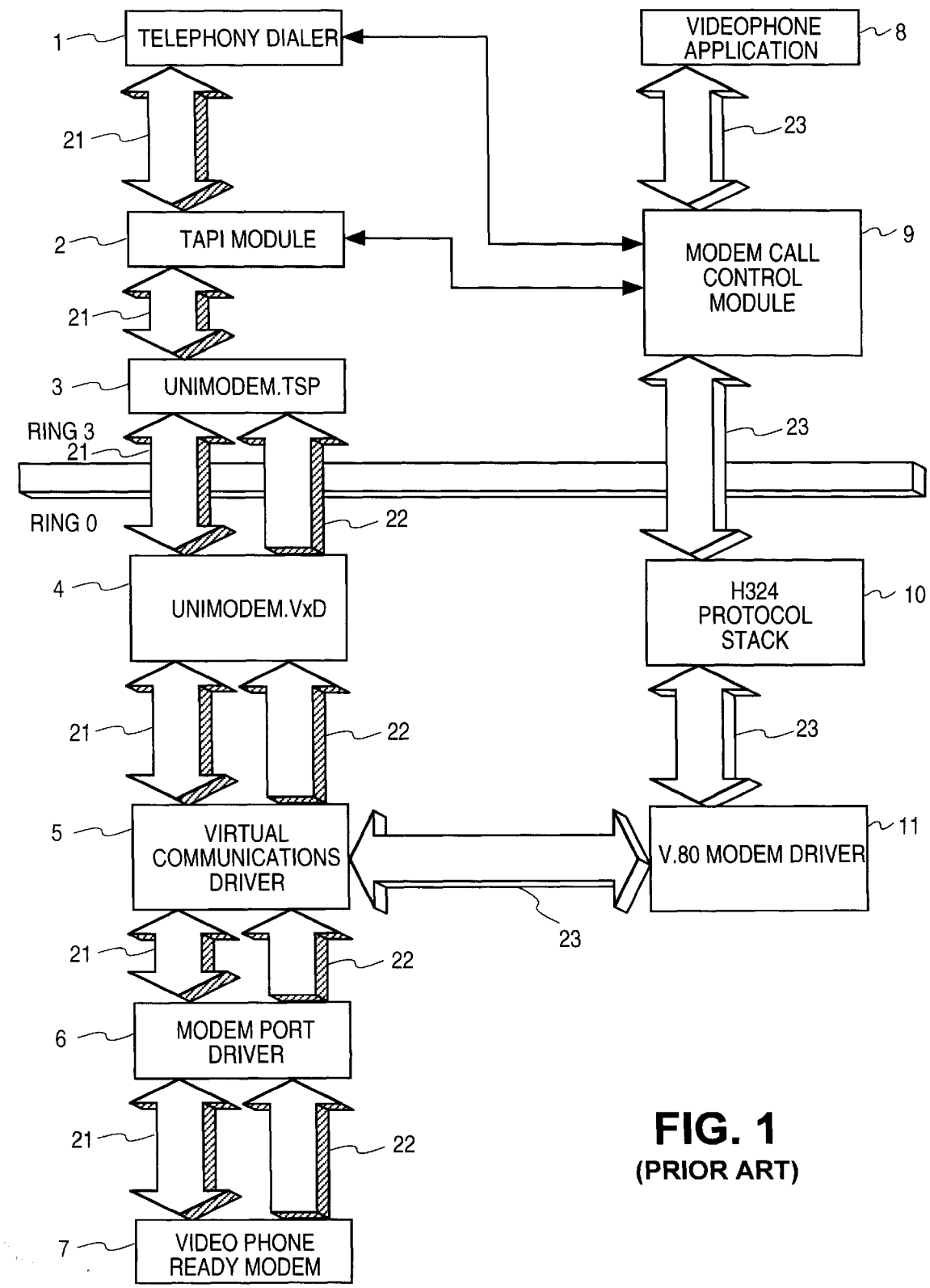
FIG. 1 is a block diagram showing layers and data flow in one example of a prior art system.
Figure 2:
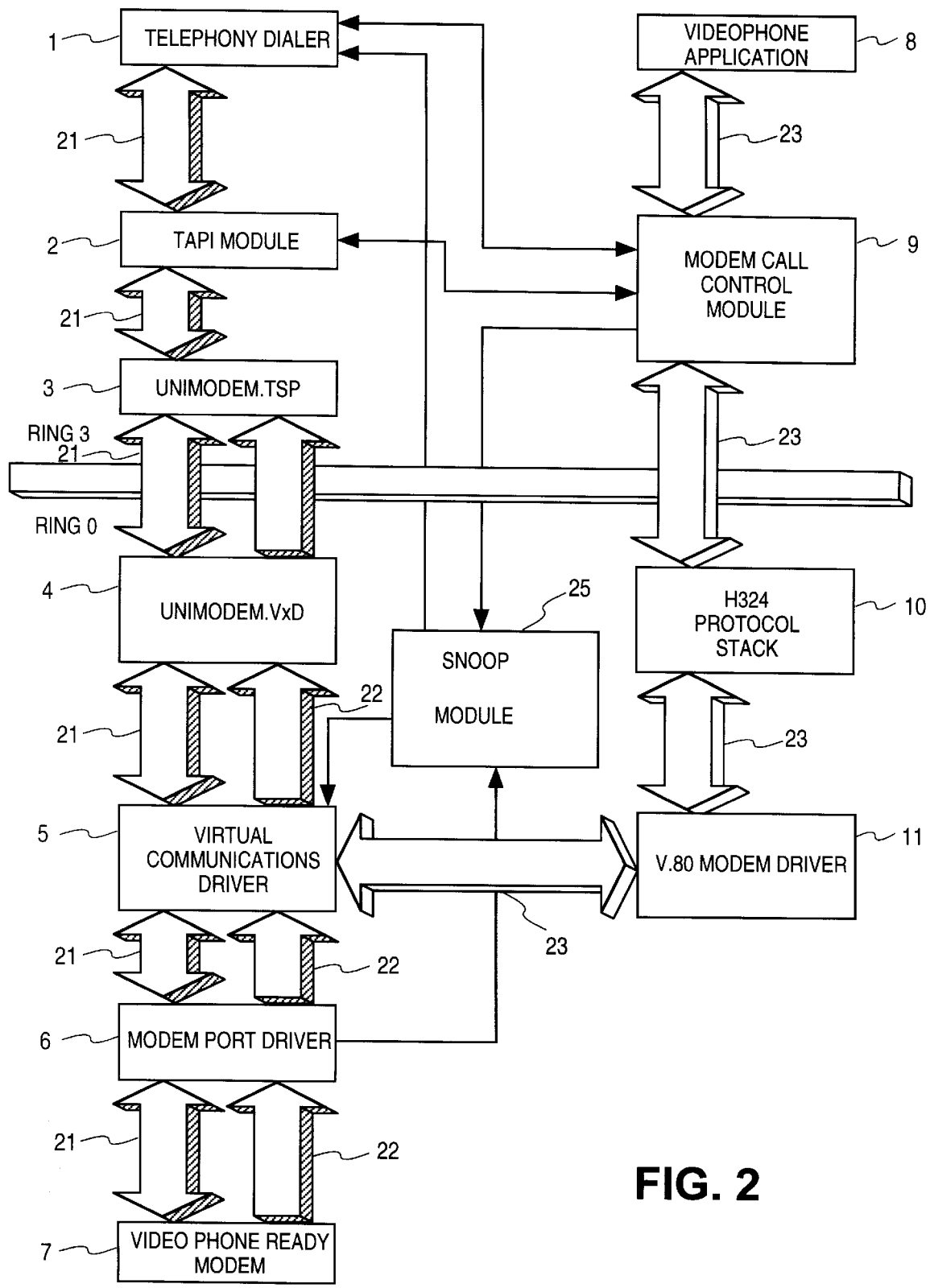
FIG. 2 is a block diagram showing layers in data flow in one embodiment of the invention.
Figure 3:
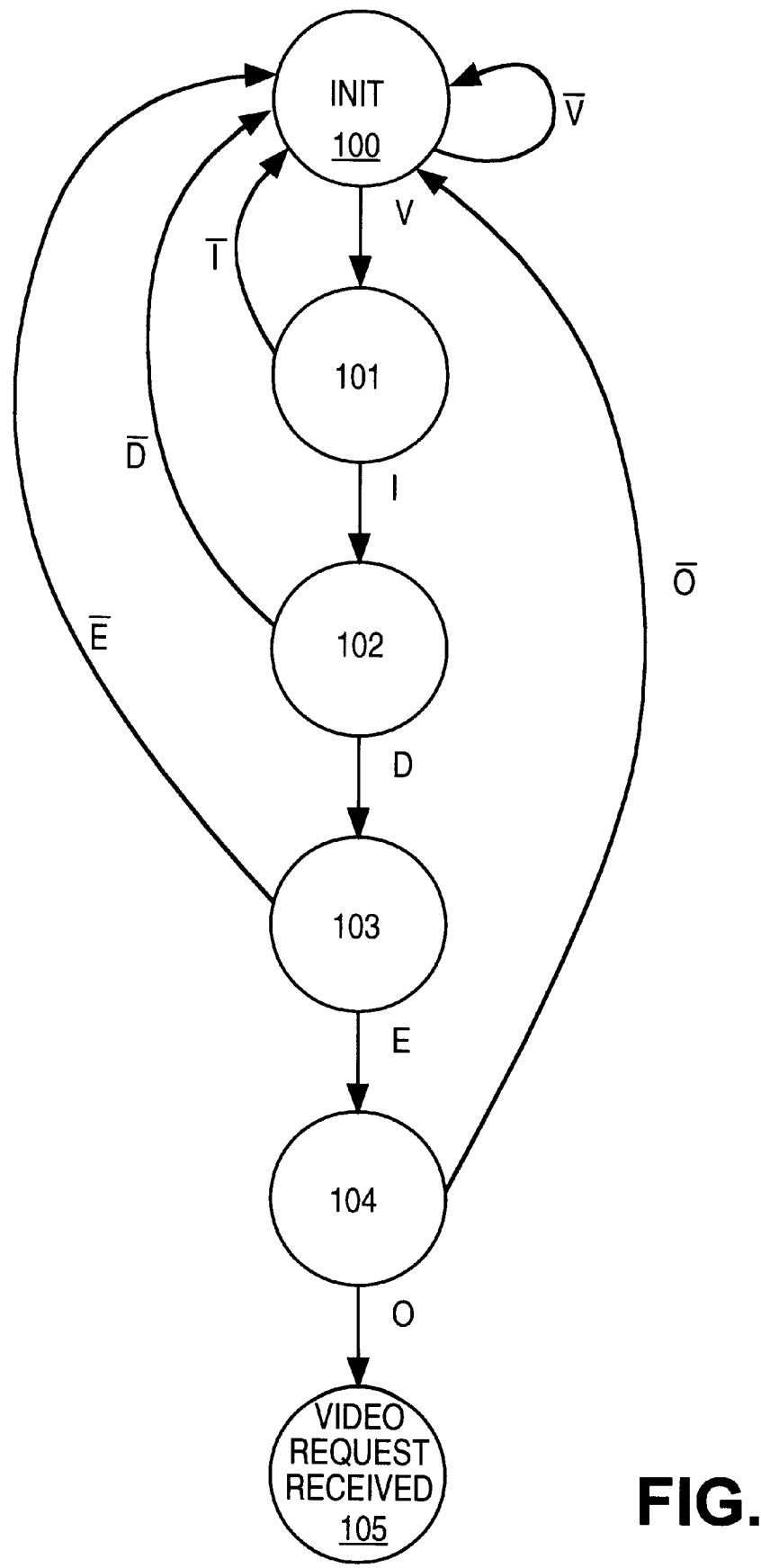
FIG. 3 is a state diagram illustrating the operation of a snoop module in one embodiment of the invention.

FIG. 2 is a block diagram showing layers in data flow in one embodiment of the invention. Again, a telephony dialer 1 communicates with a TAPI module 2. The Unimodem.tsp 3 which in turn communicates with Unimodem.vxd 4. Virtual communications (VCOMM) driver 5 receives and forwards commands from and to Unimodem.vxd 4 and drives the commands to the modem port driver 6 which sends the commands out to modem 7. In the shown embodiment the ancillary mode is videophone mode. Ancillary data path 23 is formed by the videophone application 8, the modem call control (MCC) module 9, the H324 protocol stack 10 and the V.80 modem driver 11. A snoop module 25 is provided and when snooping is enabled as discussed below the snoop module 25 receives in parallel from the modem port driver 6 the same data as received by the virtual communications driver 5. The snoop module 25 parses the incoming data to identify requests to switch into the ancillary mode. In one embodiment, the snoop module effectively implements a state machine to identify the ancillary mode request. FIG. 3 shows an example of how this might be implemented.

FIG. 3 is a state diagram illustrating the operation of a snoop module in one embodiment of the invention. In FIG. 3 it is assumed that the request to switch to videophone is a character string "VIDEO". In actual practice this will not be the case. However, for the purposes of illustration it is useful. The snoop module begins in an initial state 100 and remains in that state as long as the character received is not V. If V is received, the state machine transitions to state 101. If the next character is anything but an I, the state machine transitions back to the initial state 100. If the next character received is an I, the state machine transitions to state 102. From state 102, if the next character is anything but D, the state machine transitions back to the initial state 100. If the next character is a D, the state machine transitions to state 103. From state 103, if an E is received, the state machine transitions to state 104, otherwise it transitions to initial state 100. From state 104, if an O is received, the state machine transitions to state 105 and signals that a video request has been received. If anything other than an O is received as the next character in state 104, the state machine transitions back to an initial state 100.

Figure 4A:
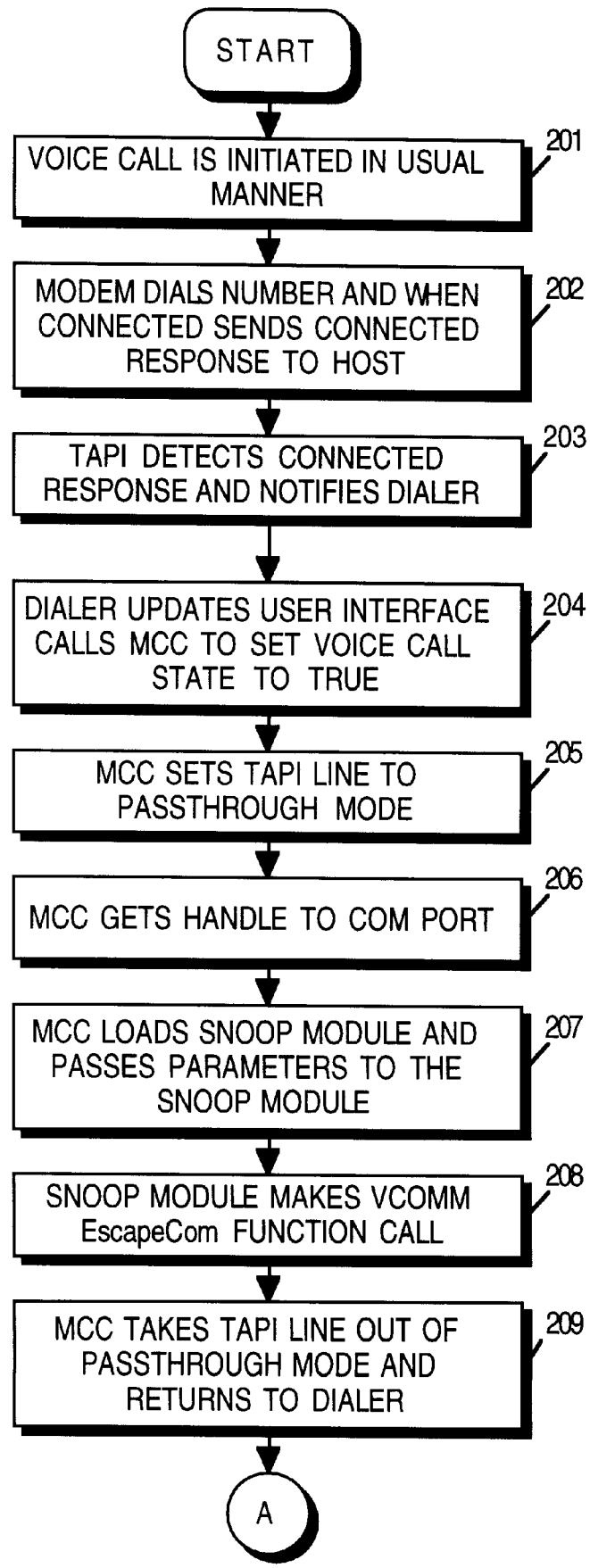
FIGS. 4 a–c are a flow chart of operation of one embodiment of the invention.
Figure 4B:
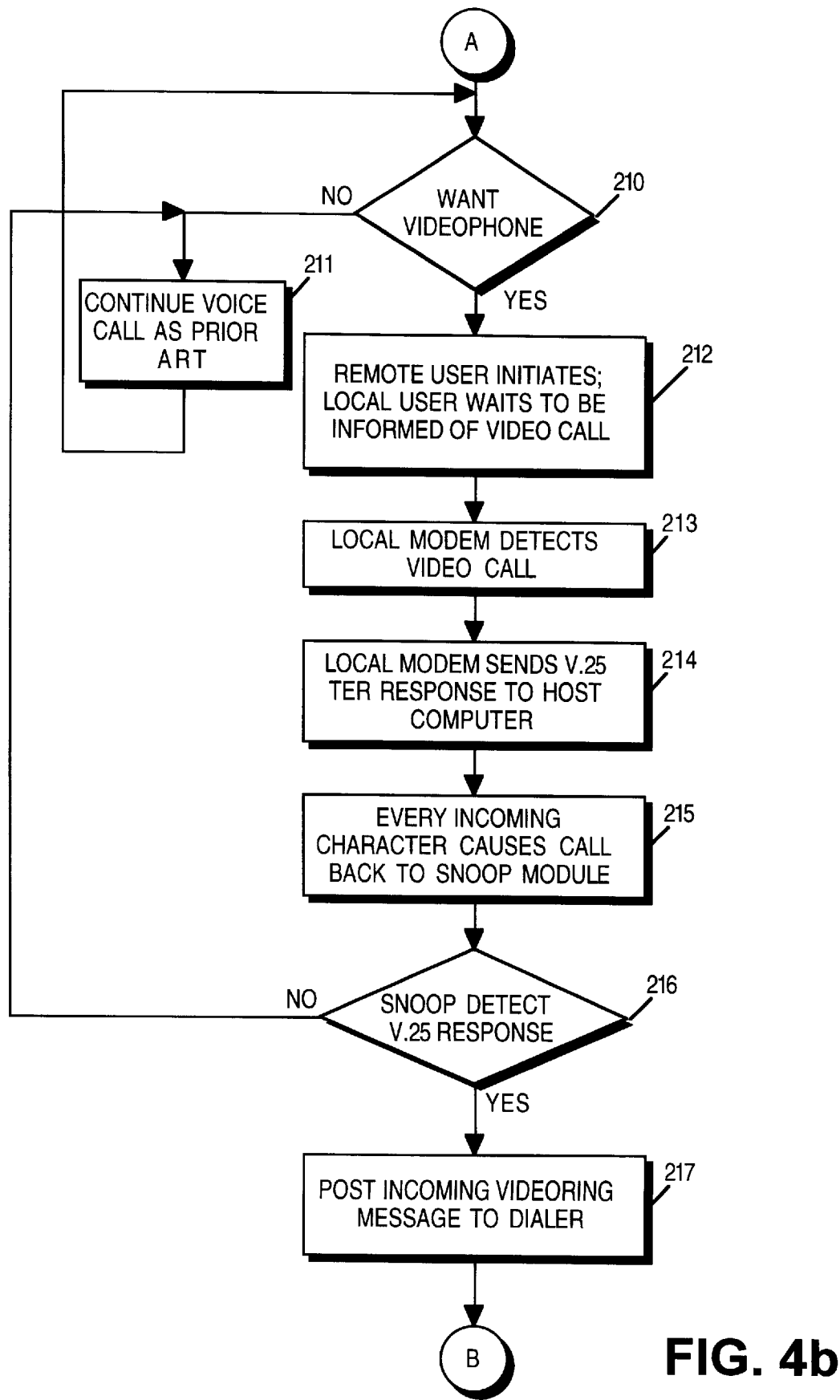
Figure 4C:
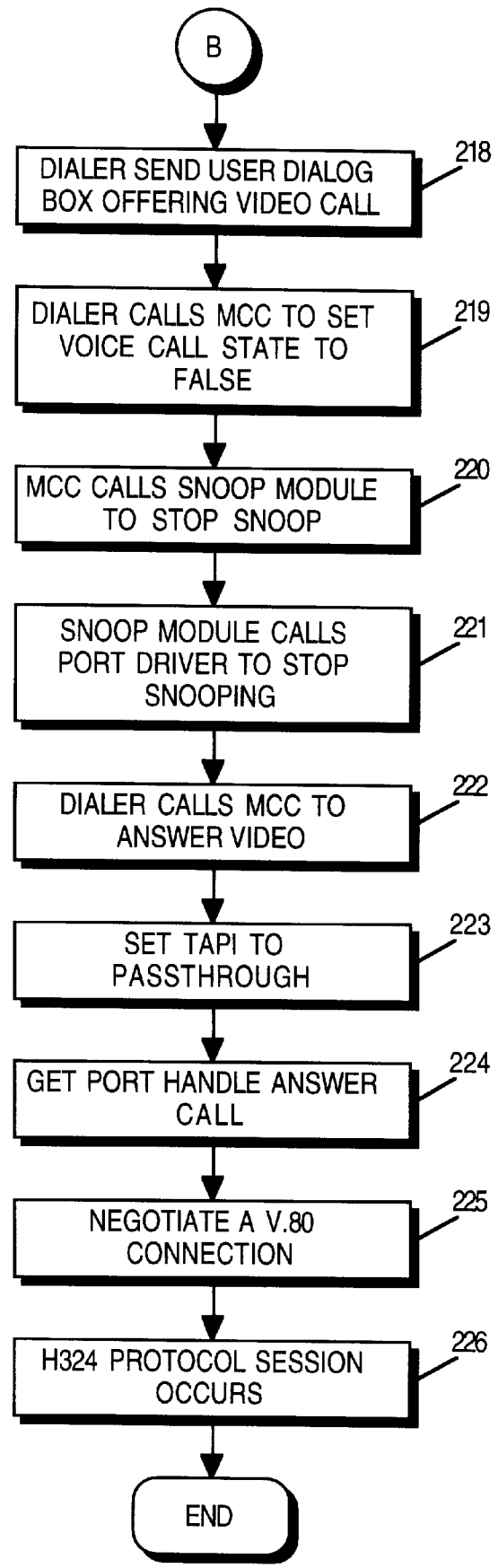

FIGS. 4 a–c are a flow chart of operation of one embodiment of the invention. At functional block 201, a voice call is initiated in the usual manner. At functional block 202 a modem dials the telephone number and when connected sends a connected response to the host. Functional block 203, TAPI detects a connected response and notifies the dialer. In response to the connected notification, the dialer updates the user interface and calls the MCC module to set the voice call state to true, at functional block 204. When the voice call state is set to true, it indicates that a voice call is in progress. At functional block 205, after the MCC sets the voice call state to true, it sets the TAPI line to PASSTHROUGH mode, which permits the MCC to get control of the port. In PASSTHROUGH mode, the TAPI module and Unimodem.tsp and Unimodem.vxd essentially relinquish control of the communication port that connects to the modem. At Functional block 206, the MCC module acquires the handle to the port. Then at functional block 207, the MCC loads the snoop module and passes its parameters. Among the parameters passed are the port handle, obtained in functional block 206, the response or responses that the snoop module is to be snooping for, a start snooping command, and a handle to a window to post, e.g. an incoming video ring message. Using these parameters at functional block 208, the snoop module makes a VCOMM EscapeComm function call passing (i) the handle for the COMM port, (ii) the function code for start snoop, and (iii) the function address to permit the port driver to call back into the snoop module. With this call, the snooping has been initiated.

At functional block 209, the MCC module then takes the TAPI line out of PASSTHROUGH mode and returns control to the dialer. At this point TAPI reacquires control of the communication port, and services voice commands and detects incoming voice events as normal. A determination is made at decision block 210 whether a videophone call is desired. This decision may take the form of the users deciding over the voice call that they both want to enter videophone mode. If videophone is not wanted, then the voice call continues as in the prior art at functional block 211. However, if videophone is desired, the remote user initiates a videophone call and the local user waits to be informed that the call has been received at functional block 212. At functional block 217 the local modem detects a video call. The local modem then sends a V.25 ter response to the host computer. As mentioned above, this response will be sent up the usual data path and discarded by the Unimodem layer. However, by virtue of the snoop initiated in functional block 208, every incoming character causes the port driver to call back to the provided address. Thus, the snoop module receives each incoming character from the port in parallel with VCOMM driver. Accordingly, the snoop module parses the data as discussed in connection with FIG. 3 to detect the response or responses for which it is snooping. If at the decision block 216 the response is not received, a normal voice call continues at functional block 211. Otherwise, the snoop module posts an incoming video ring message to the dialer at functional block 217. In response, at 218, the dialer sends a user dialog box offering the user the opportunity to accept the video call to the user. The dialer then calls the MCC module to set voice call state to false at functional block 219. Once voice call state goes to false, the MCC module calls the snoop module to stop snooping at functional block 220. The snoop module in turn calls the port driver with a stop snoop command at functional block 221. The dialer then calls the MCC module directing it to answer the videophone at functional block 222. The MCC then sets TAPI to PASSTHROUGH mode at functional block 223, acquires the handle to the port at functional block 224 and negotiates the modem into a V.80 connection at functional block 225. At functional block 226, a videophone session employing the H324 protocol occurs. Upon disconnect the routine ends.

The foregoing discussion is not intended to imply that the invention requires that a voice call be established before an ancillary mode may be entered. In the event that e.g. video phone mode is desired from the start, the receiving end of the communication link will receive a ring as normal. Once the modem takes the line off-hook, the modem will detect the incoming video call invitation. If the dialer answers the ring in voice mode, the snoop module will still be required to effect a transition into the ancillary mode.

In another embodiment of the invention the snoop module rather than using the EscapeComm function call to start snooping directly from that port, the snoop module may hook calls by Unimodem to read the port. In this way the snoop module is called each time VCOMM driver initiates a read of the port. This method will fail if Unimodem does not read the port. Either of the above methods maintains the simplicity of the port driver and generally permits detection and response to ancillary communication modes.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method comprising the steps of:

initiating a snoop of a port to detect a request to enter an ancillary mode;

transmitting in parallel data from the port to a usual recipient and a snooping module;

identifying in the snooping module if the data is a request to enter the ancillary mode; and initiating a transition into the ancillary mode if the request is identified.

2. The method of claim 1 wherein the step of initiating a transition comprises the steps of:

discontinuing the snoop of the port; and negotiating a V.80 connection with a remote modem.

3. The method of claim 1 wherein the step of identifying comprises the step of:

comparing an incoming character with an expected next character of a request to enter the ancillary mode;

transitioning to a next state if the incoming character is the expected next character; and transitioning to an initial state if the incoming character is not the expected next character.

4. The method of claim 1 further comprising the steps of:

setting a TAPI line to a passthrough mode;

setting a handle to the port;

loading a snoop module; and passing the handle to the port, a character string corresponding to a request, and a window handle to the snoop module.

5. The method of claim 4 wherein the step of initiating a snoop comprises the steps of:

making a function call with parameters including the port handle, a start snoop function code and a call back address.

6. The method of claim 5 further comprising the step of removing the TAPI line from passthrough mode once the snooping has been initiated.

7. An apparatus comprising:

a telephony dialer;

a telephony application programming interface module supporting a plurality of modes interfacing between the telephony dialer and a port;

a snoop module which detects an incoming string from the port corresponding to a request to enter an ancillary mode; and, a modem call control (MCC) module responsive to the snoop module, which facilitates a transition into the ancillary mode.

8. The apparatus of claim 7 further comprising:

a virtual communication (VCOMM) driver; and a modem port driver which simultaneously transmits incoming characters to the VCOMM driver and the snoop module.

9. The apparatus of claim 7 wherein the snoop module comprises:

a comparator comparing each incoming character with a next expected character; and a state machine that transitions through a series of states if each incoming character is the next expected character and transitions to an initial state any time the incoming character is not the next expected character.

10. The apparatus of claim 7 wherein the ancillary mode is video phone mode.

11. The apparatus of claim 10 further comprising:

a video phone application;

an H324 protocol stack; and a V.80 modem driver wherein the application, H324 protocol stack and V.80 modem driver in combination with the MCC module support videophone mode.

12. A system comprising:

a host having a port;

a modem capable of handling both supported modes and ancillary modes, the modem coupled to the port;

an interface module supporting only the supported modes;

a dialer communicating with the modem via the interface module; and a snoop module snooping the port for a string corresponding to an ancillary mode.

13. The system of claim 12 further comprising:

a modem call control (MCC) module wherein the dialer passes control to the MCC module responsive to notification from the snoop module that the string has been received, the MCC module establishing data flow between an application and a protocol stack supporting the ancillary mode;

an application supporting the ancillary mode; and a protocol stall supporting the ancillary mode.

14. The system of claim 13 wherein the ancillary mode is videophone mode.

15. The system of claim 14 wherein the stack is an H324 protocol stack.

* * * * *

UNITED STATES PATENT AND TRADEMARK OFFICE
CERTIFICATE OF CORRECTION

PATENT NO.    : 6,041,075                                          Page 1 of 1
DATED         : March 21, 2000
INVENTOR(S)   : Caushik It is certified that error appears in the above-identified patent and that said Letters Patent is hereby corrected as shown below:

<u>Title page, Item [54] and Column 1, line 3,</u>
Delete "TAP1" and insert -- TAPI --.

Signed and Sealed this

Twenty-eighth Day of January, 2003

JAMES E. ROGAN
*Director of the United States Patent and Trademark Office*